Figure 1:
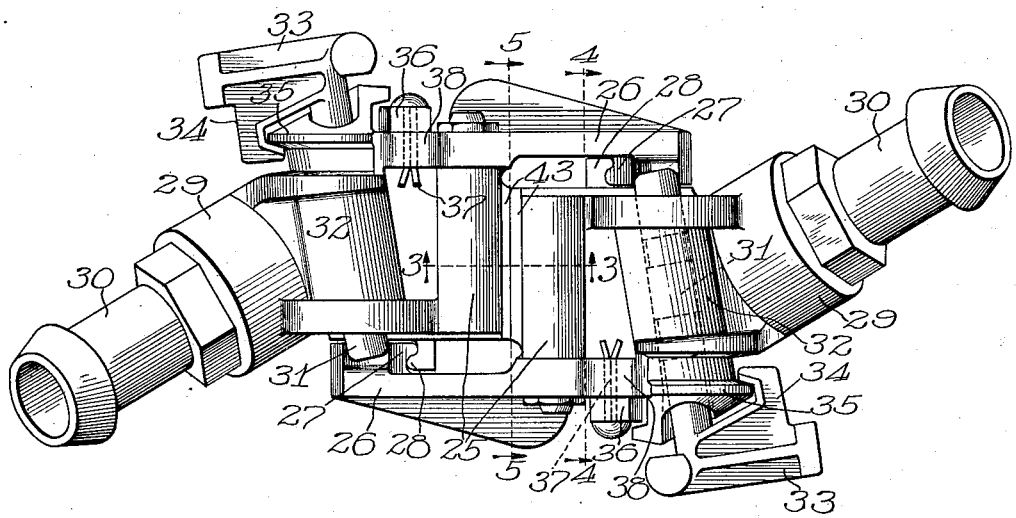

E. H. GOLD.
HOSE COUPLING.
APPLICATION FILED JUNE 5, 1911.

1,024,627.

Patented Apr. 30, 1912.

4 SHEETS—SHEET 1.

Witnesses:

Inventor:
E. H. Gold

E. H. GOLD.
HOSE COUPLING.
APPLICATION FILED JUNE 5, 1911.

1,024,627.

Patented Apr. 30, 1912.
4 SHEETS—SHEET 2.

Fig. 4ᵃ.

Witnesses:
Inventor:
E. H. Gold,
By his Attorney

E. H. GOLD.
HOSE COUPLING.
APPLICATION FILED JUNE 5, 1911.
1,024,627.
Patented Apr. 30, 1912.
4 SHEETS—SHEET 3.
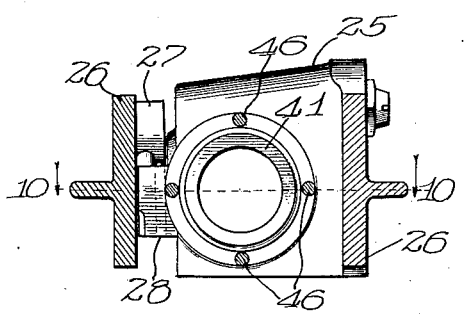
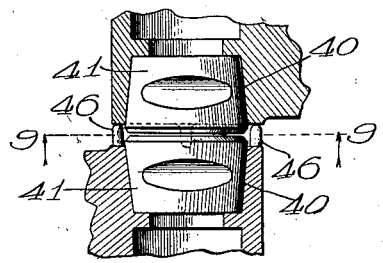
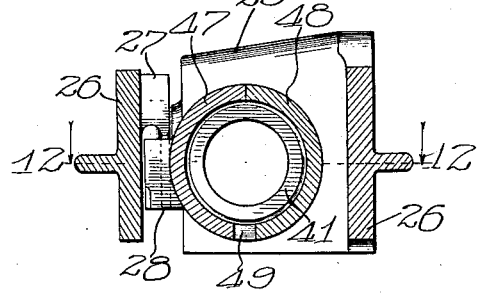
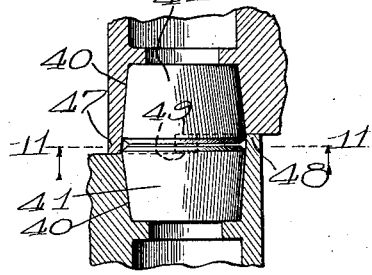
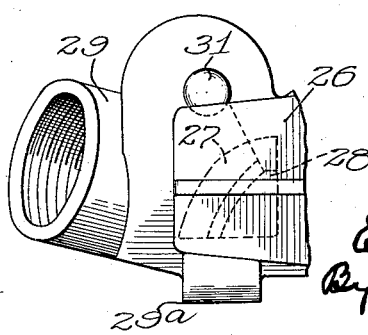

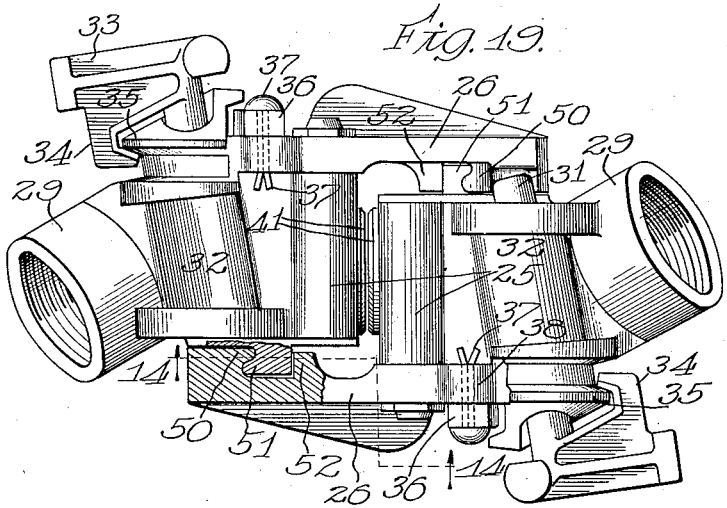
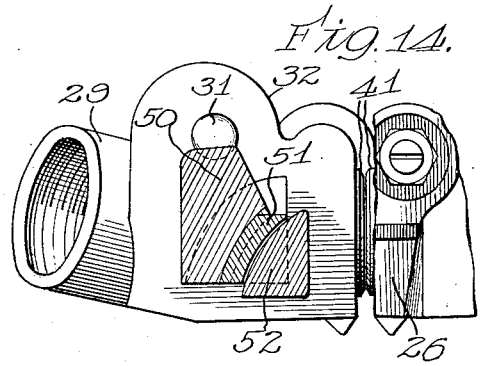
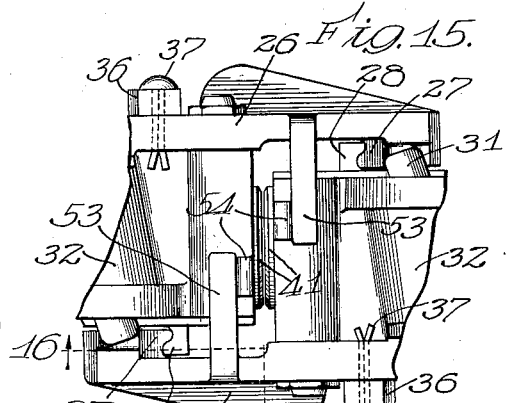
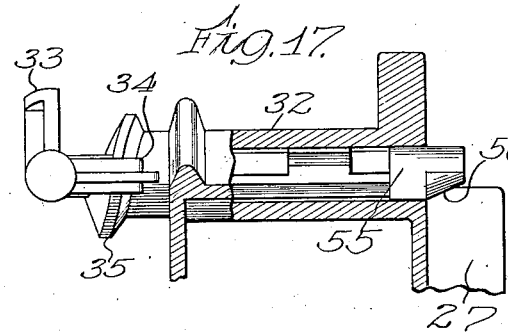
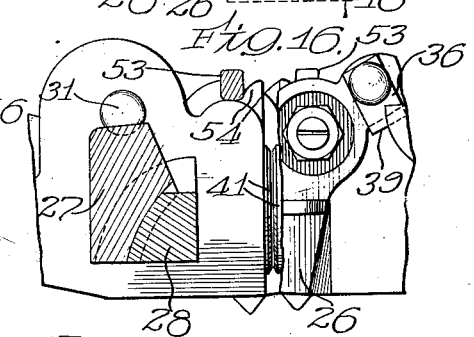

UNITED STATES PATENT OFFICE.

EGBERT H. GOLD, OF CHICAGO, ILLINOIS.

HOSE-COUPLING.

1,024,627. Specification of Letters Patent. Patented Apr. 30, 1912.

Application filed June 5, 1911. Serial No. 631,252.

*To all whom it may concern:*

Be it known that I, EGBERT H. GOLD, a citizen of the United States, residing at Chicago, in the county of Cook and State of Illinois, have invented certain new and useful Improvements in Hose-Couplings, of which the following is a specification.

My invention relates to hose couplings and particularly to hose couplings of the gravity type for use in connection with the steam train pipes of railway cars in which a steam tight joint between the coupler heads is made by means of expansible gaskets, in general form cylindrical and made of certain rubber compositions well known in the art, which gaskets are seated in recesses in the steam ports of the coupler heads and are held in place therein by suitable locking or holding devices of various kinds which permit the ready removal of the gaskets in the event that the same become worn or for other reasons have to be replaced.

A primary object of my invention is to provide a hose coupling of this type with or without a lock either of the positive or impositive type of such construction that the complementary coupler heads will be brought to a definite, fixed coupling position before the expansible gaskets are seated against each other to make a steam tight coupling, combined with expansible gaskets of sufficient size and body to insure durability, so mounted that the gaskets will be seated against each other to provide a steam tight coupling solely by the expansion of said gaskets, and preferably solely by the longitudinal expansion of said gaskets.

A further object of my invention is to so construct a coupling of this character that the excessive expansion of the gaskets under steam, that is to say, the expansion of gaskets of the character indicated in excess of the amount necessary to insure a tight seating of the gaskets against each other, will be taken up by the clearance or space surrounding the gaskets when cold.

Another object of my invention is to provide such a coupling in which the gaskets may be entirely seated within the face of the coupling, so as to protect the gaskets, especially the seating faces thereof, against external injury.

Another object of my invention is to provide such a coupling in which the usual drainage valves may be dispensed with, the contraction of the gaskets serving to open a drainage outlet from the coupling, which outlet will be closed by the expansion of the gaskets under steam.

Another object of my invention is to provide such a coupling so constructed that the gaskets will not be subject to compression and injury at the hinging point of the coupling during the operation of interlocking the coupling heads.

Another object of my invention is to provide such a coupling provided with a lock which shall not require any take-up feature consequent upon the wearing down of gasket faces as with couplers now in use, and thereby avoiding undue compression of the gasket consequent upon undue tightening of the take-up feature of the lock.

Another object of my invention is to provide such a coupling which may at all times be rigidly locked together, thereby avoiding any play between the coupler heads, while eliminating the necessity for any take-up feature in the coupler lock.

Another object of my invention is to provide such a coupler which may be so constructed that the usual kink or curve in the hose where it connects with the train pipe and with couplers of this type may be avoided, thereby prolonging the life of the hose.

Another object of my invention is to provide a coupler of this type in which the usual metal bushing in the gasket may be dispensed with, thereby lessening the cost of the coupling and greatly lessening the cost of maintenance.

Another object of my invention is to provide certain improvements in the coupler lock.

The invention has for further objects such other new and improved constructions, arrangements and devices relating to hose couplings as are herein shown and claimed.

In train pipe couplings of the gravity type heretofore used, the coupling has consisted of complementary coupling heads adapted to couple together with a downward swinging movement, the coupling heads being provided with angularly extending nipples which connect with one end of the hose leading to the train pipe. Owing to the movement between the ends of the cars, there must be a considerable length of this hose to provide the necessary slack, and as taking up of the slack, especially with the stiff hose commonly in use, tends to rock the coupling upwardly and uncouple it, the coupler nipples extend at a very slight angle to minimize this tendency and to lessen the working between the complementary halves of the coupler head. As a consequence of this construction, the hose bends at quite a sharp angle where it leaves the train pipe and again at a comparatively sharp angle where it connects with the coupler nipple, so that between the adjacent ends of two coupled cars the hose forms a deep loop having four bends in it, against which bends the high pressure steam is directed with considerable force as it travels through the train, which action, supplementing the bending of the hose, tends to wear and crack the hose at these bends, so that with hardly an exception the hose give out at these points long before the straight portion of the hose is worn out. Furthermore, these loops provide pockets for water of condensation to collect in, especially when the train is not under steam. Consequently when the train is not under steam in cold weather the water of condensation will freeze in these loops unless some means is provided which will discharge the water of condensation, but which will close when steam is supplied to the train pipe. This necessitates providing the coupler heads with special valves, many of which have been devised with more or less success, but all of which add to the mechanism of the coupler heads, to the expense of the device and to the cost of maintenance. Furthermore, it was long ago discovered that thin or ring like gaskets are short lived, being quickly crushed, marred, jammed and warped in service, resulting in an unreliable sealing of what should be a steam tight joint to resist the usual high pressure of steam used on railway cars. This obviously is not only wasteful of steam, but is dangerous to the employees. Consequently gaskets of substantial length and body have come into general use to insure durability and a more reliable sealing of the joint. These gaskets are mounted so as to project from the face of the coupler heads, with the result that when the coupler heads are brought together with a downward swinging or hinging movement, the lower edges of these gaskets projecting from the faces of the coupler heads are first brought together and subjected immediately to an objectionable compression, with the result that in service it is found that the gaskets, as the result of this mashing down at this point, most frequently give out and leak at this hinging point. To overcome this, various devices in the way of rocking gaskets have been constructed, requiring a special milling of the coupler heads and special fittings for securing the gaskets in the coupler heads, all of which adds to the expense of installation and maintenance. Furthermore, with the couplers in use with the projecting gaskets, when the coupling heads have been brought to interlocking position, the abutting gaskets constitute the only stop to limit the hinging together of the couplings. Inasmuch as these gaskets become flattened and crushed to an extent varying according to the time the gaskets have been in service, the position of the coupler heads with relation to each other varies so that when it has been found desirable to provide the couplers with locking devices, that is supplemental devices which shall resist the uncoupling of the coupler heads, it has been impossible to design a lock which shall at all times be effective unless the lock is provided with some spring or take-up feature which shall hold the couplers snugly together, regardless of whether the projecting faces of the gaskets be thin or thick, that is, regardless of whether the gaskets are new or old. Aside from the fact that this take-up feature adds to the cost of the gaskets, it opens a possibility of misuse, because with a wedging or take-up feature to the lock, an employee may wedge the lock too tightly, thereby breaking some part of the structure or unnecessarily mashing the projecting faces of the gaskets or locking the coupler so tightly together that it can be unlocked only with difficulty. Furthermore, with the couplings having the projecting gaskets of considerable length and body, it will be noted that the gaskets are first jammed tightly together when the coupling is locked, a usual practice being to hammer the couplings together, and then, when steam is applied, the co-efficient of expansion of the gaskets is such that the gaskets must expand along the lines of least resistance. As the gaskets are mounted in solid metal seats, they can only expand either inwardly, that is to say, by buckling, thereby obstructing the steam passage through the gasket, or else they are squeezed out between the adjacent faces of the coupling heads, thereby flattening and thinning the projecting faces of the gaskets, shortening the life of the gasket and interfering with the efficiency of the gasket when couplings containing such flattened gaskets are subsequently inter-coupled with other couplings. To partly remedy this defect, it is the general practice to provide the interior of the gaskets with metal sleeves or bushings, as it is highly important that the steam passage shall not be restricted. This merely results in directing all of the expansion to the space between the couplings and hastens the destruction of the gasket.

With a coupler constructed according to my invention, the kinks or bends in the hose can be largely or wholly eliminated, the special valve mechanisms in the coupler heads may be dispensed with, the mashing of the gaskets when coupling is avoided, the necessity for rocking gaskets is eliminated, bushings in the gasket may be dispensed with, the coupler heads are always brought to the same locking position against metallic stops, so that take-up devices in the coupler locks may be eliminated, the expansion of the gasket in excess of what is necessary to form a steam tight joint is taken care of without damage to the gasket, the gaskets are at all times protected against external injury, the whole structure is cheapened and the life of the gaskets is greatly prolonged.

Figure 2:
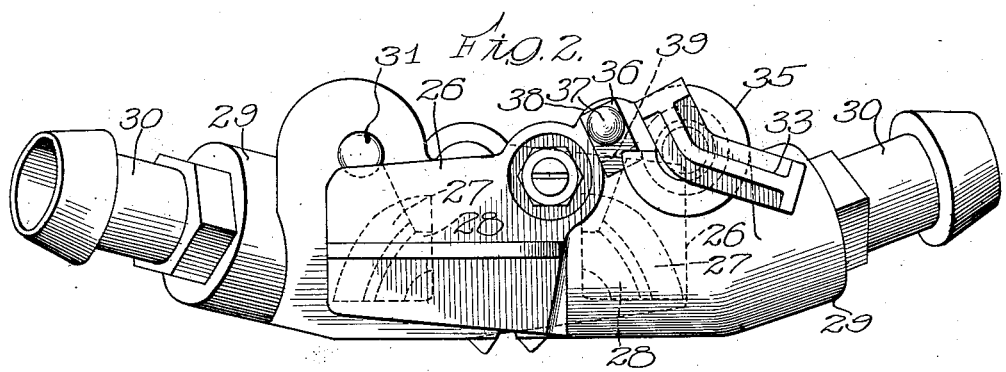
Figure 3:
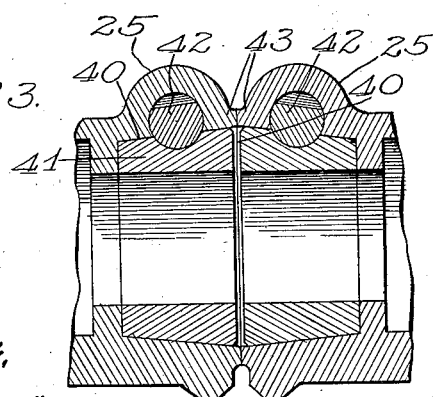
Figure 4:
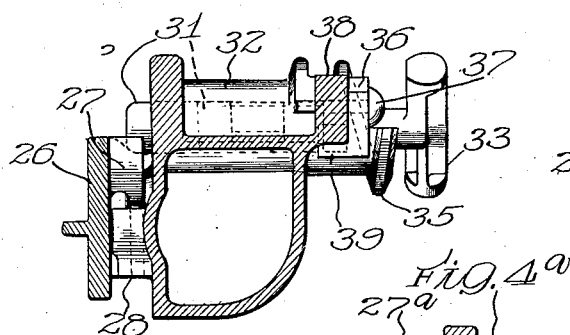
Figure 5:
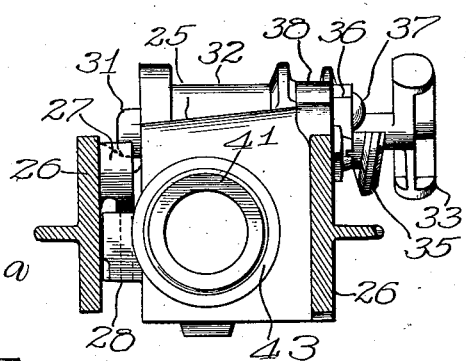
Figure 6:
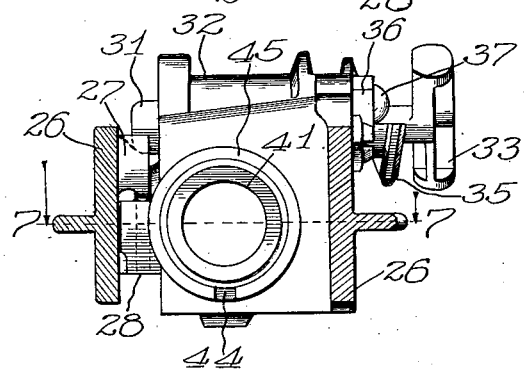
Figure 7:
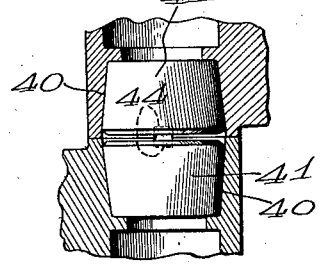
Figure 8:
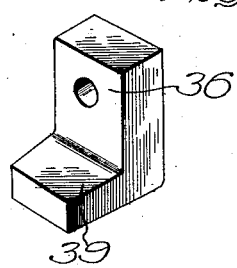

A convenient embodiment of my invention is illustrated in the accompanying drawings, wherein, Figure 1 is a plan view of one form of hose coupling constructed to embody my invention. Fig. 2 a side elevation of the same. Fig. 3 a fragmentary sectional view taken on line 3—3 of Fig. 1, looking in the direction of the arrows. Fig. 4 a similar view on line 4—4 of Fig. 1. Fig. 4$^a$ is a detail of a modification. Fig. 5 a similar view on line 5—5 of Fig. 1. Fig. 6 a view similar to Fig. 5 but showing a modified construction. Fig. 7 a sectional plan taken on line 7—7 of Fig. 6. Fig. 8 a view in perspective of the removable stop block shown in the preceding figures. Fig. 9 a sectional view taken on line 9—9 of Fig. 10, and Fig. 10 a sectional plan taken on line 10—10 of Fig. 9 illustrating a modified construction. Figs. 11 and 12 are similar sectional views illustrating another modification. Fig. 13 shows another modified embodiment of my invention. Fig. 14 a sectional view taken on line 14—14 of Fig. 19. Fig. 15 a fragmentary plan showing another modification. Fig. 16 a sectional elevation taken on line 16—16 of Fig. 15. Fig. 17 a cross sectional view illustrating a modified form of locking pin. Fig. 18 a fragmentary view in perspective of the end of said pin; and Fig. 19 a plan view, with parts in section, illustrating a somewhat different construction of coupling.

Like characters of reference indicate like parts in the several figures of the drawings.

Referring first to Figs. 1 to 5 inclusive, of the drawings, the coupling is shown as consisting of two mating coupler heads 25 each formed with an arm 26 provided with an undercut lug 27 which engages with an undercut lug 28 on the side of the complementary head. The coupler heads are preferably formed with the necks 29 provided with the usual nipples 30 for attachment of the hose. In order to prevent the coupler heads from becoming accidentally uncoupled, one, and preferably each, of said coupler heads may be provided with a locking pin 31 which is adapted to stand over or engage the upper surface of the arm of the complementary element of the coupling. The locking pin 31 is mounted in the bore of a boss 32 formed on the top of the coupler head and is provided with a handle 33 formed with a notched wing 34, the notch extending over a spiral thread 35 formed on the coupler head. In order to provide a stop for the wing 34, to prevent the pin from being disengaged from the coupler head, which stop will be sufficiently strong and so supported that it cannot be easily knocked off, I attach a block 36 to the side of the coupler head, using for this purpose a cotter-pin 37 which extends through the block and through a suitably formed flange 38 on the upper side of the head. The block 36 is angular in shape (see Fig. 8) and one member of the same, 39, extends under a projecting portion of the coupler head (see Fig. 4), so that a perfectly rigid stop is provided which can be put in place after the pin 31 has been introduced into its housing.

The steam ports of the coupler heads are enlarged at their outer ends to form recesses 40 which receive the gaskets 41, which, as usual, are made of some composition, such as "Vulcabeston" of a character to expand under the influence of heat. The gaskets are held in place by the usual bolts 42.

A salient feature of the coupling of my invention is that the coupler heads are held in their operative position by positive stops, without putting any appreciable pressure on the gaskets, that is, while the gaskets remain cold. Indeed, it is preferable that, under these conditions, the gaskets be under no pressure and out of contact with each other. In either case they may be said to be in non-closing relation as unexpanded they do not make a close joint. I have disclosed several different constructions for attaining this end. In the form of device shown in Fig. 5, which is my preferred form, the opposed faces of the coupler heads are formed with circular projections 43 which abut when the coupling is made. The gaskets when cold and contracted are flush with the circular projections 43, or, if desired, they may stand a little inside of these projections, being thereby protected from external injury.

In the coupling thus constructed the gaskets are put under no appreciable compression when the heads are first interlocked. The interlocking engagement of the coupler heads is entirely independent of the gaskets. The opposed faces of the coupler heads when interlocked come into contact with each other and the gaskets are made short enough so that no pressure is put upon them. In other words, according to my invention the coupler heads are interlocked and held in rigid relationship quite independently of the gaskets, while in the coupling of this type heretofore used the gaskets by their abutment provide the stop in this engagement. In the drawings I have shown an actual clearance between the ends of the gaskets. This is not essential, but is preferable. They might be made to come together and touch each other so long as no substantial compression takes place when the coupling is made. When the steam is turned on the gaskets expand and by pressing one against the other make a tight joint. Under certain circumstances it may be desirable to reinforce the gaskets with the usual brass bushings, but in view of the fact that there is not the same expansive force exerted between them, it is quite feasible to omit the bushings, which, of course, cheapens very considerably the cost of the gaskets. Especially is this true where the gaskets are so loosely mounted that there is a clearance between the cold gaskets and the gasket seats in the coupler, on all sides of the gaskets, in which event the initial expansion of the gaskets serves to take up the clearance, while the ultimate expansion is sufficient to make the joint steam tight. The above described construction has another advantage. As soon as the steam has been turned off and that in the train pipe is condensed, the gaskets contract and the joint between them opens. Even though the opening is but slight, it will be sufficient to allow the water of condensation to drain off. In other words, the construction gives an automatic vent for water of condensation which opens when the steam is turned off, while providing, nevertheless, a steam tight joint effective when the pipe is under steam. If this feature is not considered desirable the circular projections or bosses 43 may have their meeting faces formed together closely, as indicated in Fig. 3, so that this close abutment of the coupler heads checks the escape of steam in case the gaskets become worn or injured so as to be ineffective.

As the coupler heads are abutted rigidly one against the other without the interposition of the compressible gaskets, it is quite feasible to employ a locking pin which simply stands above the arm of the complementary coupler head, that is, it is not necessary that the pin should have a wedge action upon the arm against which it bears. With the construction of couplers heretofore used, it has been customary to taper the point of the locking pin, when a locking pin is used, so that the pin is wedged against the arm with which it engages, thereby insuring a close fit between the meeting faces of the resilient gaskets. While a tapered locking pin might be employed (and such a pin is shown in Figs. 6, 13, 14, 15 and 16), I prefer to use a straight, that is a non-tapered, pin such as that shown in the first five figures, for coupler heads of my device, when coupled, are always brought to the same definite relation.

In Figs. 6 and 7 I have shown a slightly modified construction, the modification consisting in cutting openings 44 in the circular projections on the opposed faces of the coupler heads, the projections being here designated 45. The openings 44 facilitate the discharge of water of condensation, and inspection of couplings as to gaskets.

In Figs. 9 and 10, instead of the circular projections, the opposed faces of the coupler heads are formed with the projections 46.

In Figs. 11 and 12 the faces of the coupler are formed with the oppositely arranged arcuate projections 47, 48, each a little less than a half circle, a space 49 preferably intervening between them for drainage. This insures centering of the couplers.

In the modification shown in Fig. 13 the stop is provided in the form of a lug cast on the under side of the coupler head to engage the under side of the arm of the mating coupler.

In the modification shown in Figs. 14 and 19 the rigid relationship between the coupler heads is accomplished, without bringing the opposed faces of the heads into contact by providing in addition to the undercut lugs 50 on the arm and the undercut lug 51 on the coupler head, a second projection or lug 52 on the arm and adapted to engage with the other side of lug 51 from that engaged by the lug 50.

In Figs. 15 and 16 the arm and head are provided with the usual undercut lugs 27 and 28 and in addition the arm has a transverse projection 53 which, when the coupling is made, comes into contact with a lug 54 on the top of the head. In this way a rigid engagement is made between the elements of the coupling without bringing the faces of the coupler heads into contact.

In Figs. 17 and 18 I have shown a modified form of locking pin. The pin is designated 55 and its end is tapered off but only on one side. The surface 56, formed by the tapering of the pin, is preferably also eccentric with respect to the axis of the pin, so that it operates as a cam when the pin is rotated. This surface is employed when the coupler head is mated with a head of an ordinary coupling, that is, when the pin is to be used for tightening up the engagement between the resilient gaskets. In such case the surface 56 comes into contact with an oblique surface formed on the arm 57 of the complementary coupler head. When a coupler head provided with a pin of this character is coupled with one of like construction, the pin is turned until the cylindrical surface at the end of the pin meets or stands above the coupler arm. In such case there is no need for any wedge action.

Of course, with various of the forms of couplers made to embody my invention the gaskets may be so proportioned to the gasket seats and the coupler construction that, if desired, they may project from the face of the coupler so long as they are not tightly seated against each other when the gaskets are cold, but I consider it preferable to construct the device so that the gaskets are seated back of the coupler faces, so that they are not exposed to injury at any time.

In Fig. 4ª I have shown the end of the locking pin projecting into a housing 27ª, one purpose of this arrangement being to protect the end of the locking pin from injury, as, for instance, by striking with a hammer, frequently used in tightening the coupling, and thus to prevent the locking pin from being bent or warped so as to interfere with its free operation.

With reference to the feature of my invention which permits of dispensing with a metal bushing in the gaskets, it should be borne in mind that the resulting economy is not merely in the original cost of the equipped coupler, but inasmuch as a coupler in its life will have at least a dozen or fifteen changes of gaskets as gaskets have heretofore been made, each of said gaskets being fitted with a metal bushing, it will be realized that my invention, first, in dispensing with the bushings, and second, in lessening the frequency with which the gaskets must be renewed, results in a very substantial saving in cost of maintenance for every coupler.

While I have shown my invention embodied in several typical forms, it will be understood that other modifications might be devised without departure from the principles of the invention. Therefore, I do not limit myself to the particulars described and shown except so far as the same are made specific limitations on certain of the claims herein.

It is my purpose to here claim both generically and in structural detail everything here shown which is patentably novel in view of the prior state of the art.

I claim:

1. A hose coupling comprising mating coupler heads, gaskets composed of material which expands under the influence of heat and arranged in said coupler heads with their inner ends abutted against the same so that when cold substantially no pressure exists between them, while when expanded under the heat of the steam they are pressed closely together to form a steam tight joint, a locking pin mounted in one of said coupler heads, a thread formed on said head, a handle on the pin, and a notched wing on the pin adapted to engage said thread, the end of the pin being substantially cylindrical and adapted to engage with a part of the complementary coupler head.

2. A hose coupling comprising mating coupler heads, gaskets composed of material which is expansible under the influence of heat arranged in said coupler heads so that when cold substantially no pressure exists between them, while when expanded under the heat of the steam they are pressed closely together to form a steam tight joint, a locking pin on one of said heads, and means for projecting the end of said pin by a spiral movement above a part of the complementary head, the end of said pin being formed with a cylindrical surface and part being formed with a tapered surface, substantially as and for the purpose described.

3. In a hose coupling, the combination with mating coupler heads made of metal, of means for engaging said coupler heads rigidly one with the other, and gaskets of rubber composition arranged within and at the outer ends of the steam ports of said coupler heads, the meeting faces of which stand in non-closing relation with each other when the gaskets are cold and which are brought together to form a steam-tight joint between said gaskets, solely by the expansibility of said gaskets under the influence of steam.

4. In a hose coupling, the combination with mating coupler heads made of metal having their steam ports enlarged at the outer ends to form gasket recesses, of means for engaging said coupler heads rigidly one with the other, and gaskets of rubber composition arranged within and filling said recesses, the inside diameters thereof being substantially the same as the diameters of the steam ports of the coupler heads, and the meeting faces of which stand in non-closing relation with each other when said gaskets are cold and are brought together to form a steam-tight joint solely by the expansibility of said gaskets under the influence of steam.

5. In a hose coupling, the combination with mating coupler heads made of metal, of means for engaging said coupler heads rigidly one with the other, and gaskets of rubber composition arranged within and at the outer ends of the steam ports of said coupler heads, the meeting faces of which stand in non-closing relation with each other when the gaskets are cold and which are brought together to form a steam-tight joint by the expansibility of said gaskets under the influence of steam, one of each of said coupler heads being provided with a locking pin having a threaded engagement therewith and formed with a cylindrical end adapted to be projected over a part of the other head.

6. In a hose coupling, the combination with mating coupler heads formed at their opposed faces with circular projections, of means for engaging said coupler heads rigidly one with the other with said projections in contact, and gaskets of rubber composition arranged within and at the outer ends of the steam ports of said coupler heads, the meeting faces of which stand in non-closing relation with each other when the gaskets are cold, and which are brought together to form a steam-tight joint between said gaskets solely by the expansibility of said gaskets under the influence of steam.

7. In a hose coupling, the combination with mating metallic coupler heads provided with means for interlocking into coupled position, of heat expansible gaskets loosely mounted in said coupler heads in non-closing relation thereto when said gaskets are cold and said coupler heads are interlocked, and which are expansible under the heat of steam passing through said coupler heads to form a steam tight joint between said coupler heads.

8. In a hose coupling, the combination with metallic coupler heads adapted to co-engage in non-closing relation with each other, of heat expansible gaskets loosely secured in said coupler heads respectively so as to provide a fluid passage in each of said coupler heads around said gasket therein respectively, said gaskets being expansible by the heat of steam passing through said coupler heads so as to form a steam-tight passage between said coupler heads when said gaskets are so expanded.

9. In a hose coupling, the combination with a pair of mating coupler heads adapted to be coupled together by a downwardly swinging movement into non-closing relation with each other, of heat expansible gaskets mounted wholly within said coupler heads respectively and in non-closing relation with each other and with the coupler heads when said couplers are co-engaged, but expansible under the heat of steam passing through said coupler heads so as to provide a steam tight joint between said coupler heads.

10. The combination with a pair of coupler heads adapted to be coupled with each other by a downwardly swinging movement, of laterally and longitudinally heat expansible gaskets wholly mounted within and wholly protected by said coupler heads when said gaskets are cold, but expansible under the heat of steam passing through said coupler heads to provide a steam tight joint therethrough, and a positive lock for holding said coupler heads tightly in interlocking engagement with each other.

11. A hose coupling comprising mating coupler heads and gaskets composed of material which expands under the influence of heat and arranged in said coupler heads with their inner ends abutted against the same so that when cold substantially no pressure exists between them, while when expanded under the heat of steam they are pressed closely together solely by such expansion to form a steam tight joint.

EGBERT H. GOLD.

Witnesses:
H. L. PECK,
G. Y. SKINNER.

---

Copies of this patent may be obtained for five cents each, by addressing the "Commissioner of Patents, Washington, D. C."